United States Patent
Huet (10) Patent No.: US 10,424,220 B2
(45) Date of Patent: Sep. 24, 2019

(54) TUTORIAL MODEL COMPRISING AN ASSISTANCE TEMPLATE

(71) Applicant: Antoine Huet, Pompey (FR)

(72) Inventor: Antoine Huet, Pompey (FR)

( * ) Notice: Subject to any disclaimer, the term of this patent is extended or adjusted under 35 U.S.C. 154(b) by 138 days.

(21) Appl. No.: 15/319,114

(22) PCT Filed: Jun. 16, 2015

(86) PCT No.: PCT/FR2015/051590
§ 371 (c)(1),
(2) Date: Dec. 15, 2016

(87) PCT Pub. No.: WO2015/193605
PCT Pub. Date: Dec. 23, 2015

(65) Prior Publication Data
US 2017/0124911 A1  May 4, 2017

(30) Foreign Application Priority Data

Jun. 16, 2014 (FR) .................................. 14 55505

(51) Int. Cl.
*G09B 19/00* (2006.01)
*G09B 5/02* (2006.01)

(52) U.S. Cl.
CPC ............. *G09B 19/00* (2013.01); *G09B 5/02* (2013.01)

(58) Field of Classification Search
USPC ..... 434/81, 118, 219, 236, 307 R, 308, 309; 715/201, 202
See application file for complete search history.

(56) References Cited

U.S. PATENT DOCUMENTS

| 5,745,738 A * | 4/1998 | Ricard | G06F 9/45512 345/952 |
| 7,737,980 B2 * | 6/2010 | Le Tuan | G06T 13/80 345/440 |
| 2002/0172932 A1 * | 11/2002 | Wen | G09B 5/00 434/350 |

(Continued)

FOREIGN PATENT DOCUMENTS

| FR | 2 917 224 A1 | 12/2008 |
| WO | 00/03371 A1 | 1/2000 |
| WO | 2006/108236 A1 | 12/2006 |

OTHER PUBLICATIONS

International Search Report, dated Nov. 5, 2015, from corresponding PCT Application.

*Primary Examiner* — Kurt Fernstrom
(74) *Attorney, Agent, or Firm* — Young & Thompson (57) ABSTRACT

Disclosed is a tutorial model including at least one frame provided with an assistance template for assisting in the recording of the frame, the recording of the frame being a rush that can be incorporated into a framework for a film or series of images or image; the invention also relates to a film or series of images or image which includes a framework and rushes incorporated into the framework, the rushes being produced from such a model; a method for designing a personalized film or series of images or image; a tutored coaching method for helping a user to record frames that can be incorporated into a framework; and a tutored coaching method for helping a user to learn professional gestures.

6 Claims, 7 Drawing Sheets

(56) References Cited

U.S. PATENT DOCUMENTS

| | | | | |
|---|---|---|---|---|
| 2003/0064351 A1* | 4/2003 | Hillenbrand | ............ | G09B 7/02 |
| | | | | 434/219 |
| 2005/0010952 A1 | 1/2005 | Gleissner et al. | | |
| 2010/0173732 A1 | 7/2010 | Vaniche et al. | | |
| 2012/0122061 A1* | 5/2012 | Dohring | ................ | G09B 7/04 |
| | | | | 434/157 |
| 2012/0141961 A1* | 6/2012 | Mahave | ................ | G09B 5/06 |
| | | | | 434/236 |
| 2012/0178060 A1* | 7/2012 | Gitt | ................ | G09B 17/00 |
| | | | | 434/178 |
| 2014/0310596 A1* | 10/2014 | Lafreniere | ............ | G06F 3/0481 |
| | | | | 715/708 |
| 2015/0086947 A1* | 3/2015 | Schweid | ................ | G09B 5/06 |
| | | | | 434/219 |
| 2017/0243611 A1* | 8/2017 | Buyuklu | .............. | G11B 27/036 |
| 2017/0269945 A1* | 9/2017 | Patel | ................ | G06F 3/14 |

* cited by examiner

TUTORIAL MODEL COMPRISING AN ASSISTANCE TEMPLATE

FIELD OF THE INVENTION

This invention relates to the field of imagery. It more particularly relates to making available to a user, a tutorial model comprising at least one assistance template for assisting in the recording of at least one frame, said model allowing for the production of rushes that can be incorporated into a framework, as defined herein, to form a personalised film or series of images or image. The invention further comprises making available to the user, a personalised film or series of images or image, into which are integrated the rushes that the user has recorded.

PRIOR ART

The field of personalised video and photography devices such as compact cameras and smartphones, has undergone exponential growth over the past years. Video imagery has also grown in power in the eyes of the general public, as perfectly illustrated by the use of vectors such as YouTube. Smartphones in particular are attractive, simple, fun tools accessible by all, allowing for the creation of personal videos and photographs.

The Applicant has identified a high interest for these tools to fulfil a certain number of business needs, in particular for social, safety or training purposes. With regard to safety, for example, the use of video could, according to the Applicant, resolve a certain number of technical difficulties, in particular arising in production units.

However, although the provision of a mobile video or photography device is accessible by all, the simple taking of video or photograph sequences does not overcome the technical issue of industrialising the personalisation, or how to personalise the learning of a procedure using a series tool. The technical issue can also be defined as obtaining the compliance, by a user, with a procedure, said compliance generally involving the learning of said procedure. In particular, in the safety field, there is a need to guarantee the correct execution of safety gestures by users. There is therefore a need for a tool allowing a user to learn safety gestures.

The solution of the invention is the provision of a tutorial model allowing the user implementing the procedure to record rushes, in video or photograph form, which will then be incorporated into a non-personalised framework to produce a personalised film or series of images or image. The invention thus provides a video or photography means allowing a user to be placed in and/or making a user act in a set contextual situation, in particular for learning professional gestures, in particular professional safety-related gestures.

The document WO 2006108236 describes a method and apparatus for controlling the movement of an image displayed on a display means by generating one or more pre-determined movements by the image and by generating sounds associated with the movement, however this document does not relate to the personalisation of a film. In particular, it does not describe the video means for determining the action of the user in a contextual situation, which are used to correctly incorporate the filmed rushes in the framework.

DESCRIPTION OF THE INVENTION

The invention therefore relates to a model for recording frames and/or sequences and/or photographs that will subsequently be incorporated into a predefined framework to form a personalised film or series of images or image. According to one embodiment, the frames and/or sequences and/or photographs recorded by the user are called "rushes" or "shots". Said rushes are intended to complement a framework of a film or series of images or image, preferably of a professional and/or tutorial film or series of images or image, wherein the spaces corresponding to the rushes are left vacant.

Model

According to a first aspect, the purpose of the invention is to provide a user with a tutorial model comprising at least one frame provided with an assistance template assisting in the recording. This frame, once recorded, is called a "rush". This rush is intended to be incorporated into a framework, as defined in the section entitled "Definitions" hereinbelow, to form a personalised film or series of images or image.

According to a preferred embodiment, the model is provided to the user by means of a software application developed in order to be installed on a mobile platform, defined as being a mobile electronic device such as however not limited to: a personal digital assistant, a camera, a mobile phone, a "smartphone", a tablet or a digital player. According to a preferred embodiment, the software application is a mobile application that can be downloaded onto a computer, preferably a palmtop computer, more preferably a tablet or smartphone, comprising a mobile application operating system, a camera and means for recording a video and/or photographs. According to one embodiment, the mobile platform comprises a function for recording the frame filmed or photographed by the user, which is called a "rush". According to one embodiment, the mobile platform comprises a function for viewing the rush recorded by the user. The mobile platform further comprises a function for re-recording the rush, overwriting the previous rush considered to be unsatisfactory by the user.

According to a first embodiment of the invention, the model comprises at least one frame which itself comprises an assistance template including one or more template elements (or "elements") of the frame to be recorded, which are the graphical and/or schematic representation of a characteristic of said frame to be recorded. This template in particular comprises the restrictions that must be complied with for the frames and/or sequences and/or photographs recorded by the user to be re-incorporated into the framework. Without limiting the scope of the invention thereto, these template elements comprise or are an assistance tracing, i.e. the graphical and/or schematic representation of the contour of an object or of a person, and at least one other element that represents a characteristic of the frame chosen from among: a duration, a focal length, a position within the box, a movement, a light, a contrast, a box orientation format (vertical or horizontal), a framing format and an image format. According to another embodiment, the frame comprises at least one assistance tracing, one element representing a duration and one element representing an orientation format of the box. According to another embodiment, the frame comprises at least one assistance tracing, and elements representing a duration, an orientation format of the box and an image format.

According to one embodiment, the element representing a duration is a time line. According to one embodiment, the element representing a movement that the user must make is an arrow. According to one embodiment, the element is a fixed or animated image information field. According to one embodiment, the element comprises a hypertext link (or hyperlink).

In one embodiment, the model contains at least one sequence comprising multiple frames to be recorded, according to a set order or chronology. In one embodiment, the model does not require the recording of frames in the set order or chronology.

According to one embodiment, the user is a technician, a patient, a carer, flight crew in aircraft, or an individual confronted with a situation requiring a procedure to be learned or complied with.

Therefore, the tutorial model according to the invention is intended to be recorded then incorporated into a framework to form a personalised film or series of images or image, said model comprising at least one frame provided with an assistance template assisting in the recording and said model being made available to a user on a mobile application.

Personalised Film

According to a second aspect, the invention relates to a personalised film comprising a framework and rushes resulting from the recording of a model as described hereinabove. The personalised film is characterised in that it comprises a framework and rushes incorporated into said framework, said rushes being produced from a model comprising at least one frame provided with an assistance template for assisting in the recording, said recording being a rush that can be incorporated into a framework to produce a personalised film. Advantageously, the personalised film is such that at least 10% of the frames, preferably at least 20% of the frames, more preferably at least 40% of the frames are rushes.

According to one embodiment, at least one frame and/or sequence of the model of the film refers to an area of an industrial site or hospital, for example considered to be a high-risk area. According to another embodiment, the frames and/or sequence of the model of the film refer to portraits of staff working in an area. According to one embodiment, at least 10%, preferably at least 20%, more preferably at least 40% of the film is personalised.

Method for Designing a Personalised Film

According to a third aspect, the invention comprises a method for designing a personalised film comprising the following concomitant or successive steps:
1) the writing of a scenario, comprising at least one scene or sequence, said scenario planning for, as early as its writing phase, the personalisation of certain frames,
2) the creation of a storyboard (or "scénarimage" in French) comprising the identification of the frames to be personalised, i.e. the frames from which will be created templates, and in particular assistance tracings for assisting in the recording,
3) the production of a film comprising all frames, then the creation of the framework, which is the film before personalisation, from which have been removed the frames to be personalised and which will form the model, and from which corresponding spaces have been reserved for the rushes,
4) the creation of a model from the frames to be personalised, by the creation of at least one template, and in particular at least one assistance tracing,
5) the receipt of the rushes filmed by the user,
6) the incorporation of said rushes into the framework to form a personalised film.

According to one specific embodiment, the scenario contains at least one scene dramatizing all or part of an industrial risk situation.

Personalised Series of Images or Image

According to a fourth aspect, the invention relates to a personalised series of images or image comprising a framework and rushes resulting from the recording of a model as described hereinabove. The personalised series of images or image is characterised in that it comprises a framework and rushes incorporated into said framework, said rushes being produced from a model comprising at least one frame provided with an assistance template for assisting in the recording, said recording being a rush that can be incorporated into a framework to produce a personalised series of images or image. Advantageously, the personalised series of images or image is such that at least 10% of the frames, preferably at least 20% of the frames, more preferably at least 40% of the frames are rushes.

According to one embodiment, the personalised series of images is a "comic strip", i.e. a series of fixed images, such as drawings and/or photographs, placed in narrative sequences and that can be accompanied by texts (narrations, dialogues, onomatopoeia). According to another embodiment, the personalised series of images is projected in a predetermined order on a display means. According to another embodiment, the order in which the images of the personalised series of images are projected on a display means is not predetermined and is determined by the user. According to one embodiment, the personalised image is a poster.

According to one embodiment, the personalised series of images or image comprises one or more frames that are extracted from a personalised film or series of images according to one of the embodiments of the invention.

According to one embodiment, at least one frame and/or sequence of the model of the series of images or image refers to an area of an industrial site or hospital, for example considered to be a high-risk area. According to another embodiment, at least one frame and/or sequence of the model of the series of images or image refers to portraits of staff working in an area. According to one embodiment, at least 10%, preferably at least 20%, more preferably at least 40% of the series of images or image is personalised.

Method for Designing a Personalised Series of Images or Image

According to a fifth aspect, the invention comprises a method for designing a personalised series of images or image comprising the following concomitant or successive steps:
1) the writing of a scenario, comprising at least one frame or sequence, said scenario planning for the personalisation of certain frames,
2) the creation of a series of images or image comprising the identification of the frames to be personalised, i.e. the frames from which will be created templates, and in particular assistance tracings,
3) the creation of the framework, which is the series of images or image before personalisation, from which have been removed the frames to be personalised and which will form the model, and from which corresponding spaces have been reserved for the rushes,
4) the creation of a model from the frames to be personalised, by the creation of at least one template, and in particular at least one assistance tracing,
5) the receipt of the rush(es) recorded by the user,
6) the incorporation of said rushes into the framework to form a personalised series of images or image.

According to one specific embodiment, the scenario contains at least one scene dramatizing all or part of an industrial risk situation.

Tutored Coaching Method for the Recording of Frames

According to a sixth aspect, the invention relates to a tutored (guided) coaching method guiding a user, including the provision of the model as described hereinabove and optionally including the provision of an additional tutorial medium.

In this embodiment, the user downloads onto a mobile electronic device including a camera, a mobile application comprising a model according to the invention.

According to one embodiment, the method proposes an additional tutorial medium exposing the operational context and/or context in which the user is asked to place himself/herself and/or the scenario. According to one embodiment, an example of personalised frames is provided.

Tutored Coaching Method for Helping a User to Learn Gestures, in Particular Professional or Safety Gestures According to a seventh aspect, the invention relates to a tutored coaching method that can have, however is not limited to, the purpose of training or assisting a user in learning gestures, in particular professional gestures.

This method comprises (1) the provision of a model according to the invention, (2) the recording by the user of at least one rush, (3) the incorporation of said at least one rush into a framework as described hereinabove, and (4) the restitution to the user of the personalised film or series of images or image resulting from the incorporation of the rushes into the framework.

Definitions

In this invention, the terms below shall be understood as follows:
   The terms "frame" or "shot" refers to the smallest production unit, i.e. the unit creating the film or series of images or image. In the case of a video, the frame is generally defined as the portion of action recorded on the photographic film, or on a magnetic or digital storage medium, between the camera being turned on and it being turned off. In the case of a series of images or image, the frame is the recording of a single image, for example a photograph.
   The term "recording" refers to the acquisition and storage of a frame on a photographic film or on a magnetic or digital storage medium. In the context of the invention, the recording in particular consists in filming or taking a photograph.
   The term "sequence" refers to a set of frames concerning the same action and taking place at the same time and in the same place.
   The term "scene" refers to a drama or story unit formed from a sequence or from the assembly of multiple sequences located in multiple places and/or at multiple times, and concerning the same action.
   The term "scenario" refers to a series of sequences or scenes.
   The term "film" refers to the assembly of multiple frames and/or sequences and/or scenes.
   The term "series of images" refers to the assembly of multiple frames, each of said frames only comprising a single image.
   The term "image" refers to a single frame, said frame only comprising a single image.
   The term "rush" refers to a frame or sequence recorded by the user and intended to complete a framework. Depending on the nature of the frame, the rush is a video or a photograph.
   The term "framework" refers to a film or a series of images wherein frames or sequences corresponding to the future rushes are absent.
   The terms "personalised film" or "personalised series of images" or "personalised image" refer to the assembly resulting from the incorporation of the rushes into the framework of the film, or of the series of images, or of the image.
   The terms "model" or "tutorial model" are synonymous and refer to a series of frames comprising at least one assistance template for assisting in the recording: preferably, a model contains all frames required to complete a framework.
   The terms "template" or "assistance template" or "assistance template for assisting in the recording" are synonymous and refer to an assembly comprising one or more template elements (or "elements") of a frame, as defined hereinbelow.
   The terms "template element" or "element" are synonymous and refer to the graphical and/or schematic representation of a characteristic of a frame, knowledge of which enables the rushes to be incorporated into the framework. In a non-limiting manner, the characteristics that can be represented by means of a template element in particular include: the positioning within the box, the duration, the framing format, the vertical or horizontal orientation format of the box (landscape or portrait), the movement, the image format, the focal length, the contrast, and more generally all characteristics required in order to be able to incorporate rushes into the framework. The ability to incorporate rushes into the framework in particular includes ensuring the continuity of the image and of the action.
   The terms "tracing" or "assistance tracing" are synonymous and refer to the graphical and/or schematic representation of the contour of an object or a person, drawn based on a real object or person and at least by tracing the contours thereof. The tracing is a template element used to materialise that which must be the position of an object or person within the box.
   The term "time line" refers to the graphical and/or schematic representation of the recording time of a frame.
   The term "mobile application" refers to a software application developed to be installed on a mobile electronic device comprising a camera.
   The term "mobile electronic device comprising a camera" refers to a personal digital assistant, a mobile telephone, a "smartphone" or a telephone equipped with a mobile application operating system and a camera, or a digital player equipped with a camera.
   The terms "storyboard" or "scénarimage" in French are synonymous and refer to a) the graphical representation (drawing) or the shotlist of all or part of the frames of the scene or of the sequence, and b) all of the characteristics required to enable the frames to be incorporated with each other.
   The term "tutorial" refers to a document, film or software item enabling a technical skill to be acquired, or to a guide for introducing and assisting with the use of a product or service.

EXAMPLES

This invention will be better understood upon reading the following examples which are provided with reference to the figures and illustrate the invention in a non-limiting manner.

Figure 1A:
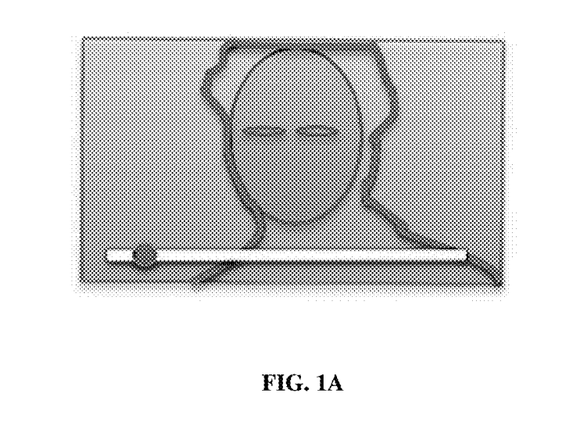
FIG. 1 is a representation of two frames in which template elements appear.

FIG. 1 shows a frame (1A) provided with a template which includes, in a non-limiting manner;
- an assistance tracing, a schematic representation of the top of a human body, comprising a face with two representations of eyes looking straight ahead,
- a rectangle representing a horizontal orientation format, called a landscape orientation, to film the frame, and
- a time line, which represents the predetermined time during which the frame must be filmed.

The user, placed in the presence of this template, therefore knows that he/she must film, for a time set by the time line, the top of a human body, place the face of the human within the oval, and hold the mobile platform in the horizontal position. His/her recording of rushes is therefore tutored (guided).

Figure 1B:
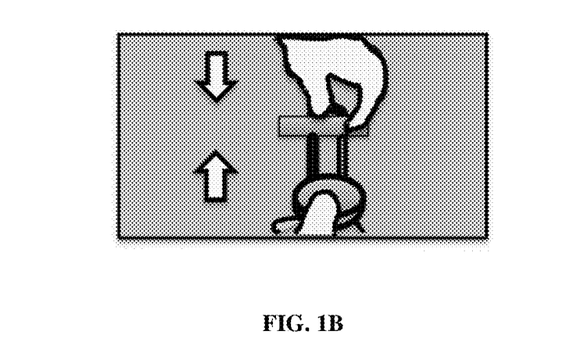

FIG. 1 also shows a frame (1B), which comprises a tracing schematically representing a left hand acting in the direction of the arrow (i.e. in a downwards direction) on the upper end of a safety padlock, and one finger of the right hand acting in the direction of the other arrow (i.e. in an upwards direction) on the lower end of said padlock. The arrows are template elements that represent the direction of the movement to be made, whereas the tracing informs the user of the position that his/her hands must assume.

Figure 2:
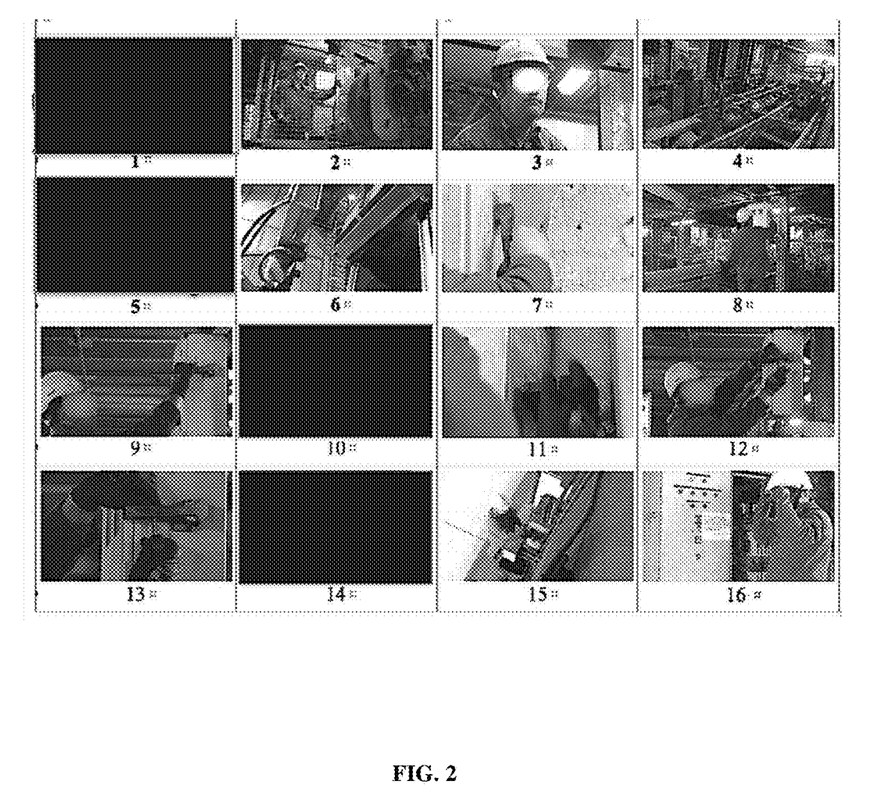
FIG. 2 is a representation of a film framework.

FIG. 2 shows a framework, i.e. a film from which the frames intended for personalisation have been removed. This framework comprises 16 frames, 4 of which are black frames; said black frames are the vacant spaces left by the frames numbered 1, 5, 10 and 14 that have been removed. These vacant spaces will be completed at a later point when incorporating the rushes filmed by a user, which are the rushes that correspond to the frames removed.

Figure 3:
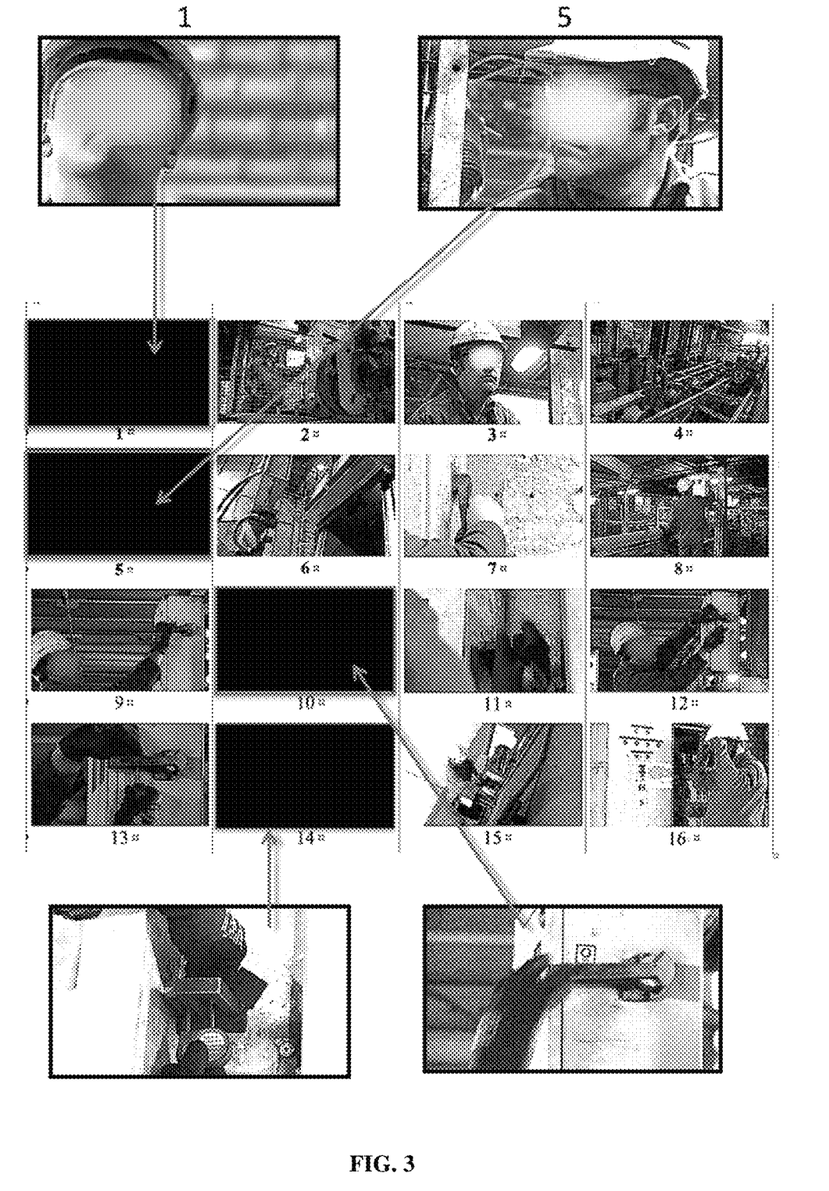
FIG. 3 is the representation of a framework and of rushes corresponding to the spaces left vacant.

FIG. 3 shows a personalised film under construction, wherein rushes are being incorporated into a framework in the position of the spaces left vacant when the frames intended for personalisation have been removed.

Figure 4:
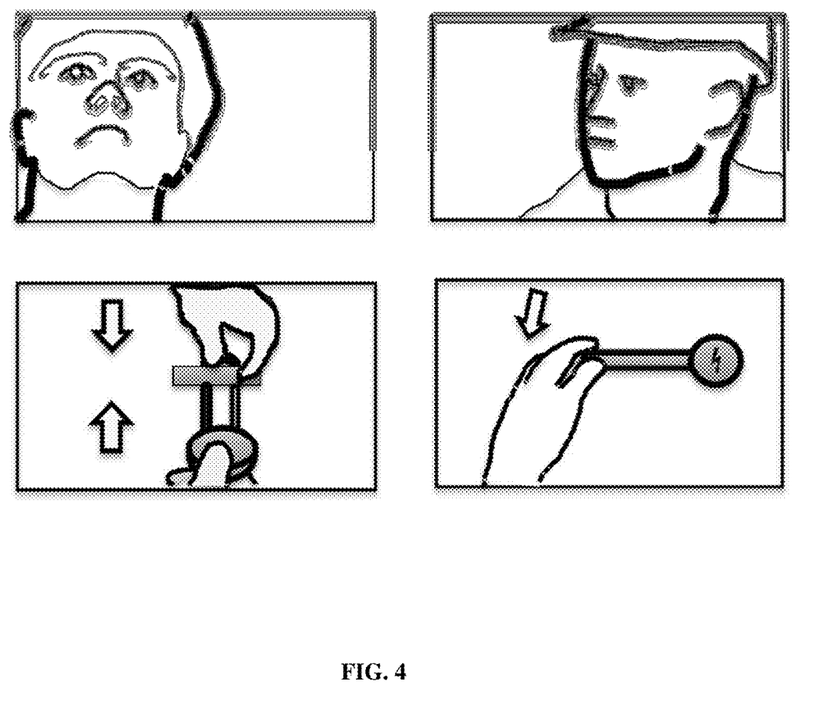
FIG. 4 is one example of a model according to the invention.

FIG. 4 shows a tutorial model according to the invention, intended to guide a user when filming a situation, and also intended to help a user learn an industrial gesture, i.e. how to install a safety padlock on an electric board before working on machinery. The templates of this model each comprise a tracing, which represents either the position that the user must assume in the box, or that of the object that he/she must handle to perform the industrial gesture. Certain templates further comprise an element (arrow) that represents the movement that the user must make to install the safety padlock.

Figure 5:
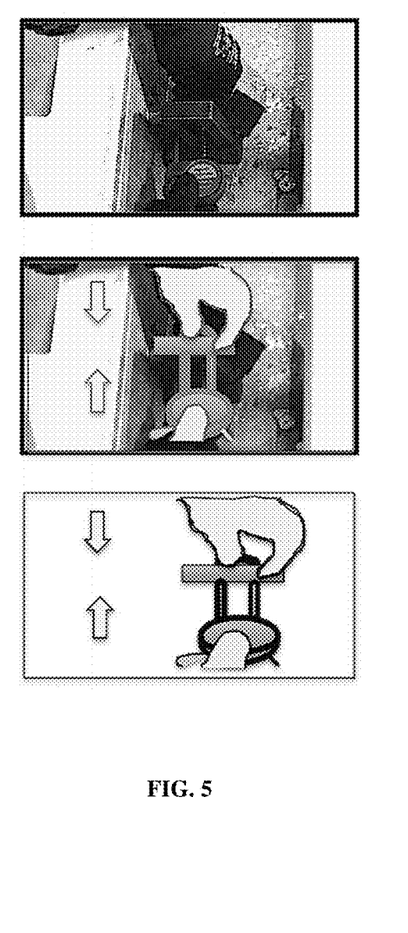
FIG. 5 is one embodiment of an assistance tracing.

FIG. 5 shows the production of a template from a frame drawn from a film, said frame showing the performance of a professional gesture. A tracing is produced by tracing the contours of the hands of the person performing the gesture. Template elements materialising the movement (arrows) are created and oriented in the direction of the movement made by the hands of the person when performing the gesture.

Figure 6:
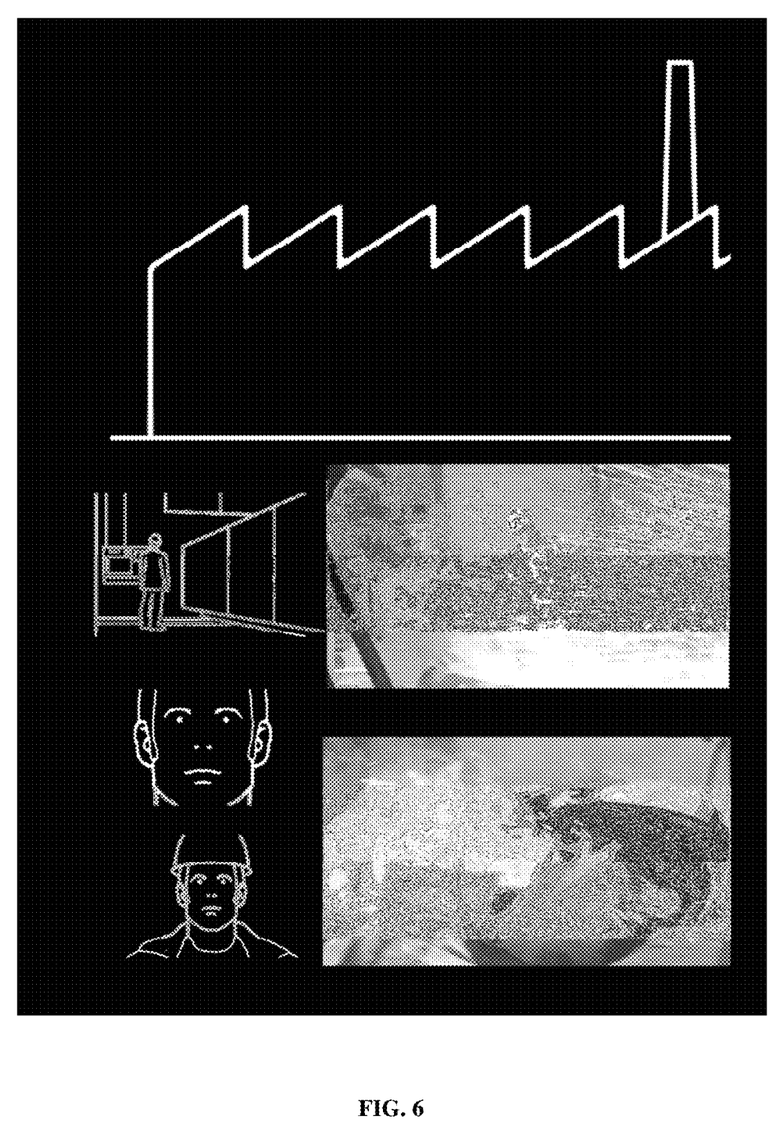
FIG. 6 is a series of images comprising frames in which template elements appear.

FIG. 6 shows a series of images of the "comic strip" type, comprising six frames, including four frames in which template elements appear. The upper frame comprises a tracing representing the shape of a plant. The three frames at the bottom left comprise a tracing respectively representing, from top to bottom: a user in his/her working environment, a close-up of the face of a user, the upper body of a user (torso). The two frames on the right are photographs that cannot be personalised.

Figure 7:
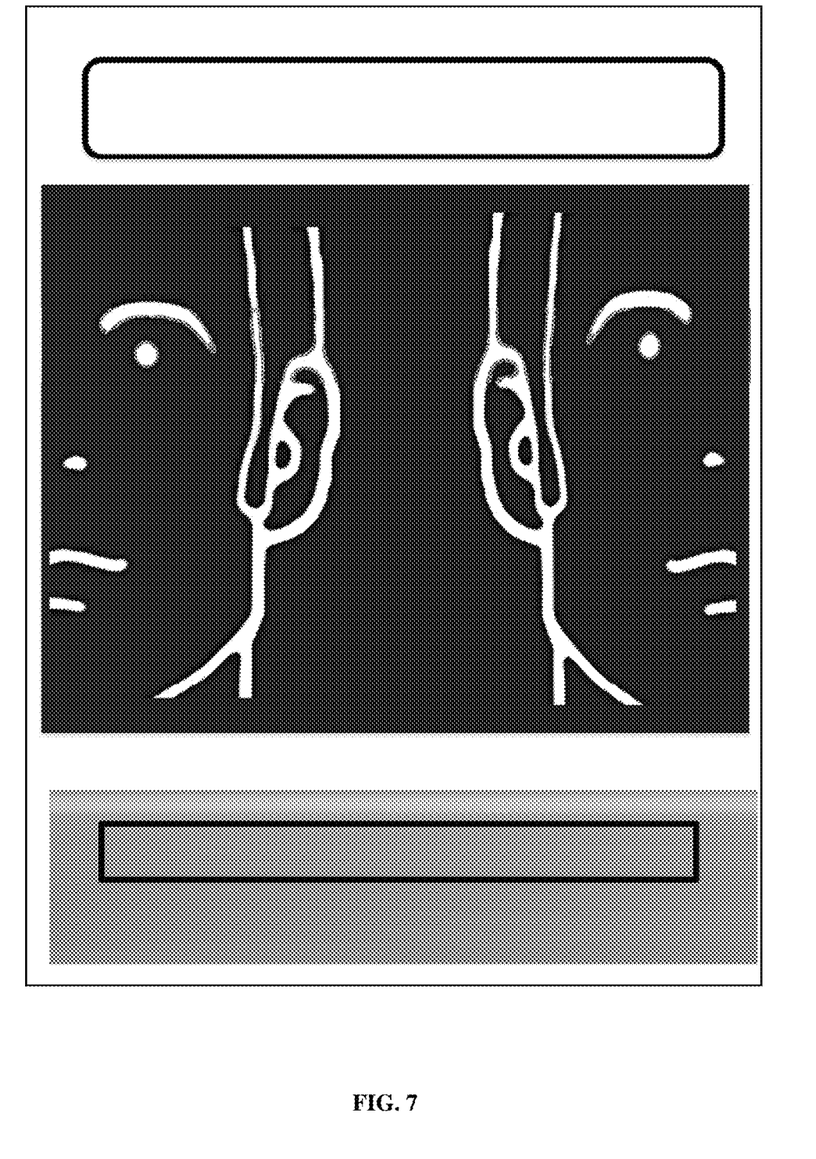
FIG. 7 is an image comprising a frame in which template elements appear.

FIG. 7 is an image comprising a frame in which template elements appear. The tracing represents half of the face of two different users. The boxes above and below the image are intended to be completed with text and/or images, for example the name of a company and its logo, or a safety or motivating slogan.

The invention claimed is:

1. A system for tutored coaching comprising:
   a storage medium comprising at least one model, wherein the model comprises at least one frame provided with an assistance template for assisting in the recording of at least one frame, said assistance template comprising at least one assistance tracing and at least one element representing a characteristic of the frame selected from: a duration, a focal length, a movement, a light, a contrast, a framing format, a box orientation format, and an image format,
   wherein the assistance template is configured to incorporate the frame into a framework, the framework being an image, a series of images, or a film in which the frames contained in the model are absent; and
   an electronic device comprising instructions that when executed causes the electronic device to carry out the following steps:
   i) generating a rush from the acquisition of at least one frame filmed or photographed by a user with a camera,
   ii) storing the rush in the storage medium, and
   iii) generating a personalized image, series of images, or film using the stored rush and the framework.

2. The system according to claim 1, wherein said model comprises at least one sequence, said at least one sequence comprising at least one frame provided with said assistance template for assisting in the acquisition of the at least one frame by the user.

3. The system of claim 1, wherein an output is a series of images being a comic strip.

4. The system of claim 1, wherein an output is at least one image comprising at least one frame extracted from a film.

5. The system of claim 1, further comprising a camera for the acquisition of the at least one frame by the user.

6. The system of claim 1, further comprising display means for displaying the rush.

\* \* \* \* \*